(12) United States Patent
Inuzuka

(10) Patent No.: US 7,816,913 B2
(45) Date of Patent: Oct. 19, 2010

(54) ROTATION ANGLE DETECTING UNIT

(75) Inventor: Yoshinori Inuzuka, Okazaki (JP)

(73) Assignee: Denso Corporation, Kariya (JP)

( * ) Notice: Subject to any disclaimer, the term of this patent is extended or adjusted under 35 U.S.C. 154(b) by 191 days.

(21) Appl. No.: 12/113,546

(22) Filed: May 1, 2008

(65) Prior Publication Data

US 2009/0015247 A1    Jan. 15, 2009

(30) Foreign Application Priority Data

Jul. 10, 2007    (JP) .............................. 2007-181052

(51) Int. Cl.
*G01B 7/30* (2006.01)
(52) U.S. Cl. .............................. 324/207.25; 324/207.2; 324/173
(58) Field of Classification Search ............ 324/207.25, 324/207.2, 173
See application file for complete search history.

(56) References Cited

U.S. PATENT DOCUMENTS 6,316,935 B1    11/2001    Vanzuilen

FOREIGN PATENT DOCUMENTS

| EP | 1 273 989 | 1/2003 |
|----|-----------|--------|
| EP | 1 388 455 | 2/2004 |
| JP | 61-026635 | 2/1986 |
| JP | 6-273430 | 9/1994 |
| JP | 11-350988 | 12/1999 |
| JP | 2001-27508 | 1/2001 |
| JP | 2004-108214 | 4/2004 |

OTHER PUBLICATIONS

Japanese Office Action dated Jun. 30, 2009, issued in corresponding Japanese Application No. 2007-181052, with English translation.

*Primary Examiner*—Reena Aurora
(74) *Attorney, Agent, or Firm*—Nixon & Vanderhye, PC

(57) ABSTRACT

A rotation angle detecting unit includes a pedal arm rotated by the pedal force transmitted from an accelerator pedal, an urging device urging the pedal arm in an opposite direction from a direction, in which pedal force is applied to the pedal arm, a pedal rotor engaging the pedal arm to transmit urging force of the urging device to the pedal arm, and a rotation angle detecting device detecting the rotation angle of the accelerator pedal. The rotation angle detecting device includes a movable part attached to the pedal rotor and thereby displaced together with the pedal rotor, and a stator that outputs an electric signal, which is associated with a rotational position of the pedal rotor due to one of magnetic and electric interactions with the movable part.

4 Claims, 3 Drawing Sheets

ROTATION ANGLE DETECTING UNIT

CROSS REFERENCE TO RELATED APPLICATION

This application is based on and incorporates herein by reference Japanese Patent Application No. 2007-181052 filed on Jul. 10, 2007.

BACKGROUND OF THE INVENTION

1. Field of the Invention

The present invention relates to a rotation angle detecting unit which detects a rotation angle of an accelerator pedal.

2. Description of Related Art

Conventionally, an accelerator opening used for operation control of an engine or the like is detected as a rotation angle of an accelerator pedal (hereinafter referred to as a pedal) rotated by pedal force and is outputted to an electronic control unit (ECU). A rotation angle detecting unit, which detects the rotation angle of the pedal, includes a movable part, which is attached to a pedal arm (hereinafter referred to as an arm) and is displaced according to rotation of the pedal, and a stator, which outputs an electrical signal according to the rotation angle of the pedal due to a magnetic or electric interaction with the movable part.

For example, as shown in FIG. 3, a rotation angle detecting unit 100 in JP2004-108214A includes a shaft member 103, which is firmly fixed to an arm 101 and is rotated with the arm 101, and which is supported by a predetermined bearing part 102, the movable part 104, which is a permanent magnet attached to the shaft member 103, and a stator 105, which is a hole IC that senses a magnetic variation according to rotation of the permanent magnet and converts the variation into an electrical signal to be outputted.

The rotation angle detecting unit 100 includes a pedal rotor (hereinafter referred to as a rotor) 107, which engages the arm 101 and is urged and rotated in a direction opposite to pedal force by a predetermined restoration spring 106, and a hysteresis plate 108, which slidingly contacts the rotor 107 and applies frictional force to the rotor 107 in a direction opposite to a rotational direction of the rotor 107. The rotation angle detecting unit 100 generates pedal force hysteresis using a difference of a direction, in which the frictional force is applied to the rotor 107 by the hysteresis plate 108, between when the pedal force is strengthened and when the pedal force is weakened. Additionally, the pedal (not shown) is formed integrally with the arm 101 at an end portion of the arm 101 on the side opposite to an end portion of the arm 101, which the rotor 107 engages.

Since a direction in which the pedal force is applied to the pedal varies widely, the movable part 104 itself also sways in the various directions and accordingly the electrical signal outputted from the stator 105 is not stabilized in the rotation angle detecting unit 100, in which the movable part 104 is integrated with the pedal and the arm 101.

Furthermore, when the movable part 104 is integrated with the pedal and the arm 101, the arm 101 and the movable part 104 are rotated simultaneously with the application of the pedal force to the pedal. Accordingly, the electrical signal outputted from the stator 105 accords promptly with the rotation of the pedal. As a result, throttle opening control in the ECU or the like needs to be deliberately delayed in order to obtain a sense of delay in an engine blow as in a conventional throttle-by-wire accelerator device.

A rotation angle detecting unit including a pedal, which is rotated and urged in a direction opposite to pedal force directly by a restoration spring, and a movable part, which is displaced according to the rotation of the pedal, is disclosed in EP1273989A1 and EP1388455A1. However, according to the above rotation angle detecting unit, the movable part easily sways due to rattling of the restoration spring and accordingly an electrical signal outputted from the stator is not stabilized because the movable part is attached near an end portion of the restoration spring.

SUMMARY OF THE INVENTION

The present invention addresses the above disadvantages. Thus, it is an objective of the present invention to solve malfunctions caused when a movable part of a rotation angle detecting means is integrated with a pedal or an arm. The above malfunctions include an unstable electrical signal outputted from a stator because of sway of the movable part, and control processing of an electronic control unit needing to be delayed in order to obtain a sense of delay in an engine blow.

To achieve the objective of the present invention, there is provided a rotation angle detecting unit that is configured to detect a rotation angle of an accelerator pedal, which is rotated by pedal force. The unit includes a pedal arm, an urging means, a pedal rotor, and a rotation angle detecting means. The pedal arm is configured to be rotated by the pedal force, which is transmitted from the accelerator pedal. The urging means is for urging the pedal arm in an opposite direction from a direction, in which the pedal force is applied to the pedal arm. The pedal rotor is formed separately from the pedal arm and engages the pedal arm to transmit urging force of the urging means to the pedal arm. The rotation angle detecting means is for detecting the rotation angle of the accelerator pedal. The rotation angle detecting means includes a movable part and a stator. The movable part is attached to the pedal rotor and thereby displaced together with the pedal rotor. The stator is configured to output an electric signal, which is associated with a rotational position of the pedal rotor due to one of magnetic and electric interactions with the movable part.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

A rotation angle detecting unit of a first embodiment of the invention detects a rotation angle of an accelerator pedal (pedal) that is rotated by pedal force. The rotation angle detecting unit includes a pedal arm (arm), to which pedal force is transmitted from the pedal and which is thereby rotated, an urging means for urging the arm in an opposite direction of the pedal force, a pedal rotor (rotor), which is provided separately from the arm and engages the arm to transmit urging force of the urging means to the arm, and a rotation angle detecting means for detecting the rotation angle of the pedal. The rotation angle detecting means includes a movable part, which is attached to the rotor and is displaced together with the rotor, and a stator, which outputs an electrical signal in accordance with a rotating position of the rotor due to a magnetic or electric interaction with the movable part. On application of the pedal force to the pedal, the rotor starts rotating in a delayed manner with respect to the arm.

The rotation angle detecting unit has a shaft member, which is firmly fixed to the rotor coaxially with a shaft center of the rotor. The movable part is a permanent magnet, which is attached to the shaft member to generate a magnetic flux perpendicular to the shaft center of the rotor. The stator is an output generating means for outputting an electrical signal, which is generated according to a magnetic change due to the rotation of the permanent magnet.

According to a rotation angle detecting unit of a second embodiment of the invention, a movable part is a magnetic material attached to the perimeter of a rotor, and a stator is an output generating means for outputting an electrical signal, which is generated according to the displacement of the magnetic material.

FIRST EMBODIMENT

Configuration of the First Embodiment

Figure 1:
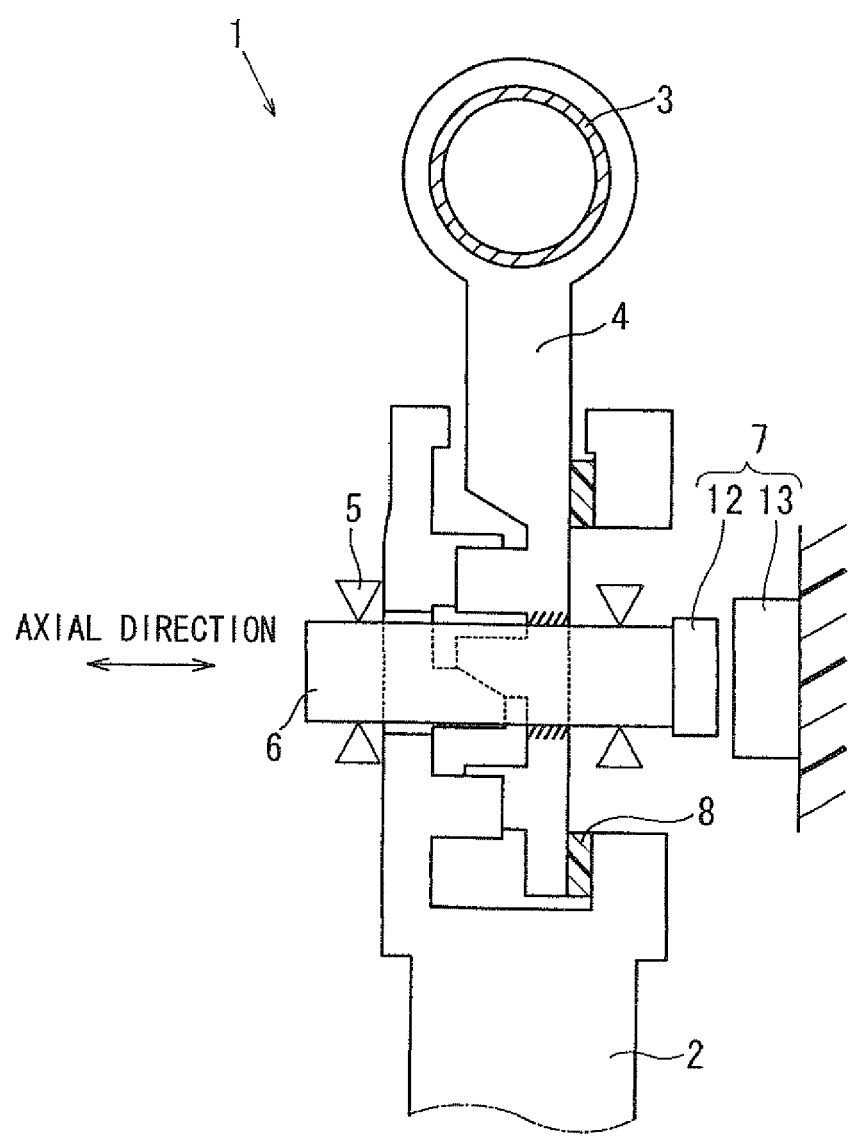
FIG. 1 is a schematic diagram illustrating a configuration of a rotation angle detecting unit according to a first embodiment of the invention.

A configuration of a rotation angle detecting unit 1 of the first embodiment is explained with reference to FIG. 1. The rotation angle detecting unit 1 detects a rotation angle of an accelerator pedal (not shown: hereinafter referred to as a pedal) which is rotated by pedal force. The detected rotation angle is sent to an electronic control unit (ECU: not shown) as an accelerator opening, which is used for operation control of an engine (not shown) and the like.

The rotation angle detecting unit 1 includes a pedal arm (hereinafter referred to as an arm) 2, to which pedal force is transmitted from the pedal, and which is thereby rotated, a restoration spring 3, which serves as an urging means for urging the arm 2 in an opposite direction of the pedal force, a pedal rotor (hereinafter referred to as a rotor) 4, which is provided separately from the arm 2 and engages the arm 2 to transmit urging force of the restoration spring 3 to the arm 2, a shaft member 6, which is firmly fixed to the rotor 4 to rotate together with the rotor 4 and supported by a predetermined bearing part 5, and a rotation angle detecting means 7 for detecting the rotation angle of the pedal. The pedal is formed integrally with the arm 2 at an end portion of the arm 2 on the side opposite to an end portion of the arm 2, which the rotor 4 engages.

The urging force of the restoration spring 3 is applied to the rotor 4, and the pedal force is applied to the rotor 4 due to its engagement with the arm 2. Accordingly, when the pedal force is applied to the pedal, the rotor 4 starts rotating later than the pedal and the arm 2. Due to its engagement with the arm 2, the rotor 4 is pressed on a hysteresis plate 8, because component force of the pedal force is applied to the rotor 4 in an axial direction of the shaft member 6.

The hysteresis plate 8 generates pedal force hysteresis which differentiates a sense of treading between in strengthening a tread on the pedal and in weakening the tread on the pedal. More specifically, the hysteresis plate 8 is fixed on the rotor 4 such that frictional force is applied to the rotor 4 in a direction opposite to a rotational direction of the rotor 4. The pedal force hysteresis is generated because a direction in which the frictional force is applied to the rotor 4 by the hysteresis plate 8 differs between in strengthening the tread on the pedal and in weakening the tread on the pedal.

The shaft member 6 is formed in a generally cylindrical shape and firmly fixed to the rotor 4 coaxially with a shaft center of the rotor 4. The shaft member 6 is formed from a resin material having high rigidity or a metal material in order to reinforce the rotor 4, to which various forces such as the pedal force, the urging force of the restoration spring 3, and the frictional force of the hysteresis plate 8 are applied.

The rotation angle detecting means 7 includes a movable part 12, which is attached to the rotor 4 to be rotationally displaced together with the rotor 4, and a stator 13, which outputs an electrical signal according to a rotating position of the rotor 4 due to a magnetic interaction with the movable part 12.

The movable part 12 includes two permanent magnets, are disposed to be opposed to each other such that a magnetic flux is generated in a direction perpendicular to the shaft center of the shaft member 6 (shaft center of the rotor 4). The movable part 12 rotates together with the rotor 4 and the shaft member 6 with the shaft center being its center of rotation.

The stator 13 is a Hall IC including a Hall element (not shown), which senses a magnetic change caused by the rotation of the permanent magnet, and a processing circuit (not shown), which converts the magnetic change sensed by the Hall element into an electrical signal. The stator 13 outputs the obtained electrical signal to the ECU. The ECU obtains an actual value of the accelerator opening based on the electrical signal inputted from the stator 13, and performs the operation control of the engine and the like according to the actual value of the obtained accelerator opening.

Advantageous Effects of the First Embodiment

According to the rotation angle detecting unit 1 of the first embodiment, the permanent magnet as the movable part 12 of the rotation angle detecting means 7 is attached to the rotor 4 to be rotationally displaced together with the rotor 4. Consequently, the movable part 12 is integrated into the rotor 4 instead of into the pedal or the arm 2. Since the pedal force is transmitted to the rotor 4 through its engagement with the arm 2, variation of a direction in which the pedal force is applied to the rotor 4 is mitigated compared to variation of a direction in which the pedal force is applied to the pedal. As a result, by integrating the movable part 12 into the rotor 4, the sway of the movable part 12 itself is mitigated compared to when the movable part 12 is integrated into the pedal or the arm 2. Therefore, the electrical signal outputted from the stator 13 is stabilized.

On application of the pedal force to the pedal, the rotor 4 starts rotating later than the pedal or the arm 2. Accordingly, the electrical signal outputted from the stator 13 when the pedal force is applied to the pedal is delayed with respect to the rotation of the pedal or the arm 2 compared to when the movable part 12 is integrated into the pedal or the arm 2. Thus, the control processing of the ECU does not need to be delayed to obtain a sense of delay in an engine blow.

The rotation angle detecting unit 1 includes the shaft member 6 having high rigidity, which is firmly fixed to the rotor 4 coaxially with a shaft center of the rotor 4, and the movable part 12 is attached on the shaft member 6. As a result, the rotor 4 is integrated with the movable part 12 without lowering the rigidity of the rotor 4. When the rotor 4 is processed to perforate the periphery of its shaft center, for example, in order to attach the movable part 12 to the rotor 4, the rigidity of the rotor 4 decreases. Since the urging force of the restoration spring 3 as well as the pedal force is applied to the rotor 4 through the engagement with the arm 2, and furthermore, the frictional force is applied to the rotor 4 by the hysteresis plate 8, the rotor 4 needs to have high rigidity. Accordingly, by firmly fixing the shaft member 6, which is formed separately from the rotor 4 to have higher rigidity, to the rotor 4, the reduction of rigidity of the rotor 4 due to the above perforating process is avoided, and thus the rigidity of the rotor 4 is maintained.

Furthermore, by attaching the permanent magnet as the movable part 12 to the shaft member 6, which is provided separately from the rotor 4, accuracy adjustment of the rotation angle detection required for the movable part 12, and adjustment for the engagement with the arm 2 and adjustment for sliding contact on the hysteresis plate 8, which are required for the rotor 4, are individually performed.

SECOND EMBODIMENT

Figure 2:
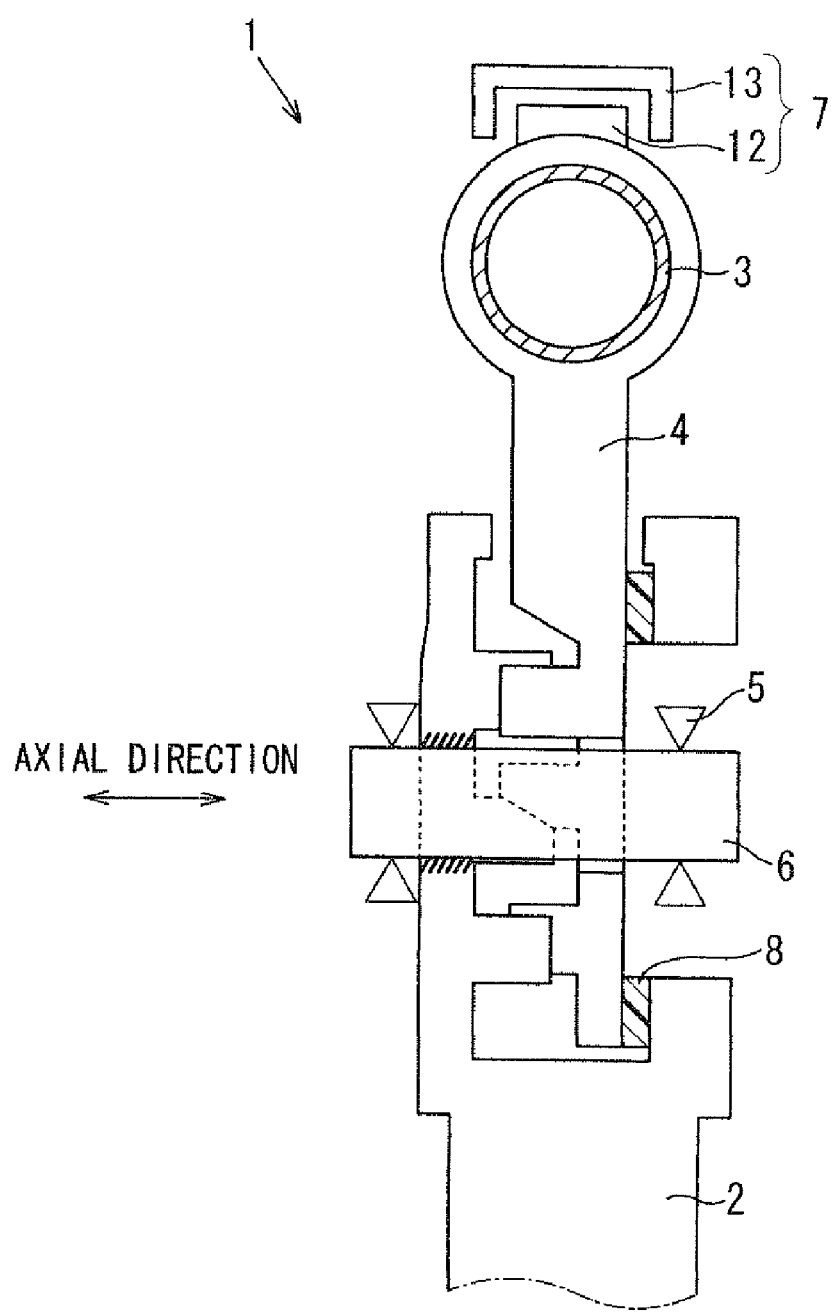
FIG. 2 is a schematic diagram illustrating a configuration of a rotation angle detecting unit according to a second embodiment of the invention.
Figure 3:
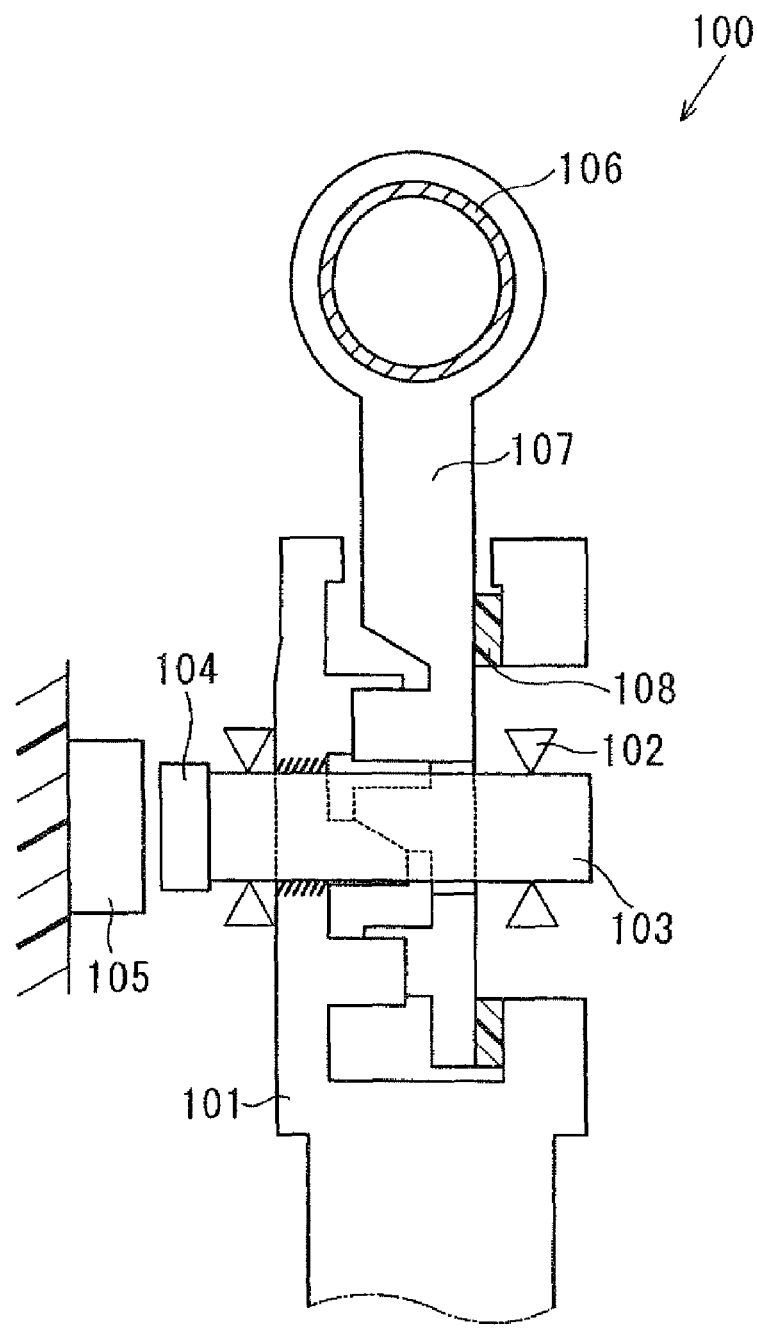
FIG. 3 is a schematic diagram illustrating a configuration of a previously proposed rotation angle detecting unit.

According to a rotation angle detecting unit 1 of the second embodiment, as shown in FIG. 2, a movable part 12 is a magnetic material attached to the perimeter of a rotor 4, and a stator 13 is an LC resonance circuit including a coil (not shown), which varies inductance according to displacement of the magnetic material. Accordingly, an eddy current that accords with the displacement of the magnetic material is generated in the magnetic material due to a magnetic field generated in the coil of the LC resonance circuit, which is put into a resonance state. (In other words, the eddy current that accords with magnetic flux density which reaches the magnetic material is generated in the magnetic material.) The coil varies the inductance according to the eddy current, and the LC resonance circuit outputs an electrical signal, which is generated according to the variation of the inductance, to the ECU.

In the above manner, by attaching the magnetic material as the movable part 12 to the perimeter of the rotor 4, an electrical signal in accordance with a rotation angle of an arm 2 is outputted to the ECU. Consequently, the movable part 12 is attached to the rotor 4 without lowering rigidity of the rotor 4 by processing the rotor 4 to perforate the periphery of its shaft center.

MODIFICATIONS

The rotation angle detecting means 7 of the first and second embodiments outputs the electrical signal in accordance with the rotating position of the rotor 4 using the magnetic interaction between the movable part 12 and the stator 13. Alternatively, the electrical signal may be outputted using an electric interaction between the movable part 12 and the stator 13. According to the rotation angle detecting unit 1 of the first embodiment, by forming the shaft member 6 from the material having high rigidity and firmly fixing the shaft member 6 to the rotor 4, the reduction of rigidity of the rotor 4 is prevented. Alternatively, the reduction of rigidity of the rotor 4 may be prevented by forming the rotor 4 from a material having even higher rigidity.

Additional advantages and modifications will readily occur to those skilled in the art. The invention in its broader terms is therefore not limited to the specific details, representative apparatus, and illustrative examples shown and described.

What is claimed is:

1. A rotation angle detecting unit that is configured to detect a rotation angle of an accelerator pedal, which is rotated by pedal force, the unit comprising:
    a pedal arm that is configured to be rotated by the pedal force, which is transmitted from the accelerator pedal;
    an urging means for urging the pedal arm in an opposite direction from a direction, in which the pedal force is applied to the pedal arm;
    a pedal rotor that is formed separately from the pedal arm and that engages the pedal arm to transmit urging force of the urging means to the pedal arm;
    a rotation angle detecting means for detecting the rotation angle of the accelerator pedal; and
    a shaft member, which is fixed to the pedal rotor to rotate integrally therewith and has a rotational axis that coincides with a rotational axis of the pedal rotor,
    wherein the rotation angle detecting means includes:
        a movable part that is attached to the shaft member and thereby displaced together with the shaft member and the pedal rotor; and
        a stator that is configured to output an electric signal, which is associated with a rotational position of the pedal rotor due to one of magnetic and electric interactions with the movable part.

2. The rotation angle detecting unit according to claim 1, wherein when the pedal force is applied to the accelerator pedal, the pedal rotor starts rotating in a delayed manner with respect to the pedal arm.

3. The rotation angle detecting unit according to claim 1, wherein:
    the movable part is a permanent magnet, which generates a magnetic flux perpendicular to the rotational axis of the pedal rotor; and
    the stator is an output generating means for outputting the electric signal, which is generated according to a magnetic change caused by rotation of the permanent magnet.

4. The rotation angle detecting unit according to claim 1, wherein:
    the movable part is a magnetic material; and
    the stator is an output generating means for outputting the electric signal, which is generated according to displacement of the magnetic material.

* * * * *